(12) United States Patent
Huang et al.

(10) Patent No.: US 11,821,746 B2
(45) Date of Patent: Nov. 21, 2023

(54) METHOD AND APPARATUS OF PROCESSING TRAFFIC DATA, DEVICE AND MEDIUM

(71) Applicant: APOLLO INTELLIGENT CONNECTIVITY (BEIJING) TECHNOLOGY CO., LTD., Beijing (CN)

(72) Inventors: Yupu Huang, Beijing (CN); Ruihua Liao, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 63 days.

(21) Appl. No.: 17/552,190

(22) Filed: Dec. 15, 2021

(65) Prior Publication Data

US 2022/0107196 A1    Apr. 7, 2022

(30) Foreign Application Priority Data

Dec. 25, 2020    (CN) .......................... 202011572360.0

(51) Int. Cl.
*G01C 21/34*    (2006.01)
*G01C 11/36*    (2006.01)
(Continued)

(52) U.S. Cl.
CPC ..... *G01C 21/3492* (2013.01); *G01C 21/3679* (2013.01); *G01C 21/3691* (2013.01);
(Continued)

(58) Field of Classification Search
CPC ............ G01C 21/3492; G01C 21/3679; G01C 21/3691; G01C 21/3811; G01C 21/3815;
(Continued)

(56) References Cited

U.S. PATENT DOCUMENTS 8,150,612 B2    4/2012  Nagase et al.
2009/0030606 A1  1/2009  Pfeifle et al.
(Continued)

FOREIGN PATENT DOCUMENTS

CN    106969764    7/2017
CN    111220162    6/2020
(Continued)

OTHER PUBLICATIONS

Extended European Search Report issued in corresponding European Patent Application No. 21214694.8, dated May 27, 2022.
(Continued)

*Primary Examiner* — Rami Khatib
(74) *Attorney, Agent, or Firm* — Pillsbury Winthrop Shaw Pittman, LLP

(57) ABSTRACT

A method and an apparatus of processing traffic data, a device, a medium and a product are provided. The method of processing traffic data includes: acquiring initial traffic data for a vehicle, wherein the initial traffic data includes current position information of the vehicle, position information of a plurality of traffic objects and feature information; determining a relative positional relationship between the current position information of the vehicle and the position information of the plurality of traffic objects; and processing the initial traffic data based on at least one of the feature information and the relative positional relationship to acquire at least one traffic data set, so as to navigate the vehicle based on the at least one traffic data set.

20 Claims, 10 Drawing Sheets

(51) Int. Cl.
*G08G 1/01* (2006.01)
*G08G 1/056* (2006.01)
*G08G 1/0968* (2006.01)
*G01C 21/36* (2006.01)

(52) U.S. Cl.
CPC .......... *G08G 1/0112* (2013.01); *G08G 1/056* (2013.01); *G08G 1/096844* (2013.01)

(58) Field of Classification Search
CPC .. G01C 21/3874; G08G 1/0112; G08G 1/056; G08G 1/096844; G08G 1/0133; G08G 1/09675; G08G 1/0125; G08G 1/0104; G08G 1/0137; G08G 1/0968; G06Q 50/30
See application file for complete search history.

(56) References Cited

U.S. PATENT DOCUMENTS

| | | | |
|---|---|---|---|
| 2010/0241344 | A1 | 9/2010 | Nagase et al. |
| 2016/0231132 | A1* | 8/2016 | Maiwand ............... G01C 21/36 |
| 2018/0053404 | A1* | 2/2018 | Horita .................... G08G 1/163 |
| 2019/0279502 | A1 | 9/2019 | Fowe |
| 2020/0066142 | A1 | 2/2020 | Fowe et al. |
| 2020/0349838 | A1* | 11/2020 | Schuller ........... G08G 1/096844 |
| 2021/0206391 | A1* | 7/2021 | Sakano ................ G06V 20/588 |
| 2021/0247201 | A1* | 8/2021 | Hori ................... G01C 21/3691 |

FOREIGN PATENT DOCUMENTS

| | | |
|---|---|---|
| CN | 111354222 | 6/2020 |
| CN | 111653114 | 9/2020 |
| CN | 111931500 | 11/2020 |
| EP | 3254061 | 6/2019 |
| JP | 2913857 | 6/1999 |
| JP | 2008-096339 | 4/2008 |
| JP | 2013-029354 | 2/2013 |
| JP | 2018-044902 | 3/2018 |

OTHER PUBLICATIONS

Heming, M et al.: "The Research of Improved Pre-fetch Strategy of the Vehicle Terminal Based on the Central Navigation", IEEE Third International Conference on Digital Manufacturing & Automation, pp. 931-934 (2012).

Office Action issued in corresponding Japanese Patent Application No. 2021-184662, dated Jan. 18, 2023.

Office Action issued in corresponding Korean Patent Application No. 10-2021-0080406, dated Jan. 27, 2023.

Office Action issued in corresponding European Patent Application No. 21214694.8, dated Mar. 20, 2023.

Office Action dated Oct. 11, 2021 corresponding Chinese Patent Application No. 202011572360.0.

* cited by examiner

METHOD AND APPARATUS OF PROCESSING TRAFFIC DATA, DEVICE AND MEDIUM

This application claims priority to Chinese Patent Application No. 202011572360.0, filed on Dec. 25, 2020, which is incorporated herein in its entirety by reference.

TECHNICAL FIELD

The present disclosure relates to a field of computer technology, and in particular, to fields of intelligent transportation, deep learning, natural language processing, etc. More specifically, the present disclosure relates to a method of processing traffic data, an apparatus of processing traffic data, an electronic device, a medium and a program product.

BACKGROUND

In a process of driving a vehicle, it is generally necessary to analyze driving conditions of the vehicle based on data of the vehicle itself and road condition data in order to navigate the vehicle.

SUMMARY

However, the data used for navigation analysis in the related art is mixed and messy, which is not conducive to analyzing the driving condition of the vehicle, resulting in a low accuracy of navigation for the vehicle.

According to the present disclosure, a method of processing traffic data, an apparatus of processing traffic data, an electronic device, a storage medium and a program product are provided.

According to an aspect of the present disclosure, there is provided a method of processing traffic data, the method including: acquiring initial traffic data for a vehicle, wherein the initial traffic data includes current position information of the vehicle, position information of a plurality of traffic objects and feature information; determining a relative positional relationship between the current position information of the vehicle and the position information of the plurality of traffic objects; and processing the initial traffic data based on the feature information and/or the relative positional relationship to acquire at least one traffic data set, so as to navigate the vehicle based on the at least one traffic data set.

According to an aspect of the present disclosure, there is provided an electronic device, including: at least one processor; and a memory communicatively connected to the at least one processor, wherein the memory stores instructions capable of being executed by the at least one processor, and the instructions, when executed by the at least one processor, cause the at least one processor to implement a method described herein.

According to an aspect of the present disclosure, there is provided a non-transitory computer-readable storage medium having computer instructions stored thereon, wherein the computer instructions allow a computer to implement a method as described herein.

It should be understood that the content described in this section is not intended to indicate critical or vital features of embodiments of the present disclosure, and is not used to limit the scope of the present disclosure. Other features of the present disclosure will become easily understood through the following specification.

BRIEF DESCRIPTION OF THE DRAWINGS

The accompanying drawings are used to better understand technical solutions of the present disclosure, and do not constitute a limitation to the present disclosure, in which.

DETAILED DESCRIPTION OF EMBODIMENTS

The exemplary embodiments of the present disclosure are described below with reference to the drawings, which include various details of embodiments of the present disclosure to facilitate understanding, and which should be considered as merely illustrative. Therefore, those ordinary skilled in the art should realize that various changes and modifications may be made to embodiments described herein without departing from the scope and spirit of the present disclosure. In addition, for clarity and conciseness, descriptions of well-known functions and structures are omitted in the following description.

The terms used here are only for describing specific embodiments, and are not intended to limit the present disclosure. The terms "include", "comprise", etc. used herein indicate the existence of the described features, steps, operations and/or components, but do not exclude the presence or addition of one or more other features, steps, operations or components.

All terms (including technical and scientific terms) used herein have the meanings commonly understood by those skilled in the art, unless otherwise defined. It should be noted that the terms used herein should be interpreted as having meanings consistent with the context of this specification, and should not be interpreted in an idealized or overly rigid manner.

In the case of using an expression similar to "at least one of A, B, C, etc." or "at least one selected from A, B, C, etc.", generally, it should be interpreted according to the meaning of the expression commonly understood by those skilled in the art (for example, "a system having at least one of A, B and C" should include, but is not limited to, a system having A alone, B alone, C alone, A and B, A and C, B and C, and/or A, B, C, etc.).

According to embodiments of the present disclosure, a method of processing traffic data is provided, the method including: acquiring initial traffic data for a vehicle, wherein the initial traffic data includes current position information of the vehicle, position information of a plurality of traffic objects and feature information. Then, a relative positional relationship between the current position information of the vehicle and the position information of the plurality of traffic objects is determined. Next, based on the feature information and/or the relative positional relationship, the initial traffic data is processed to acquire at least one traffic data set, so as to navigate the vehicle based on the at least one traffic data set.

In the technical solution of the present disclosure, the collection, storage, use, processing, transmission, provision, and disclosure of the user's personal information involved are in compliance with relevant laws and regulations, and does not violate public order and good customs.

Figure 1:
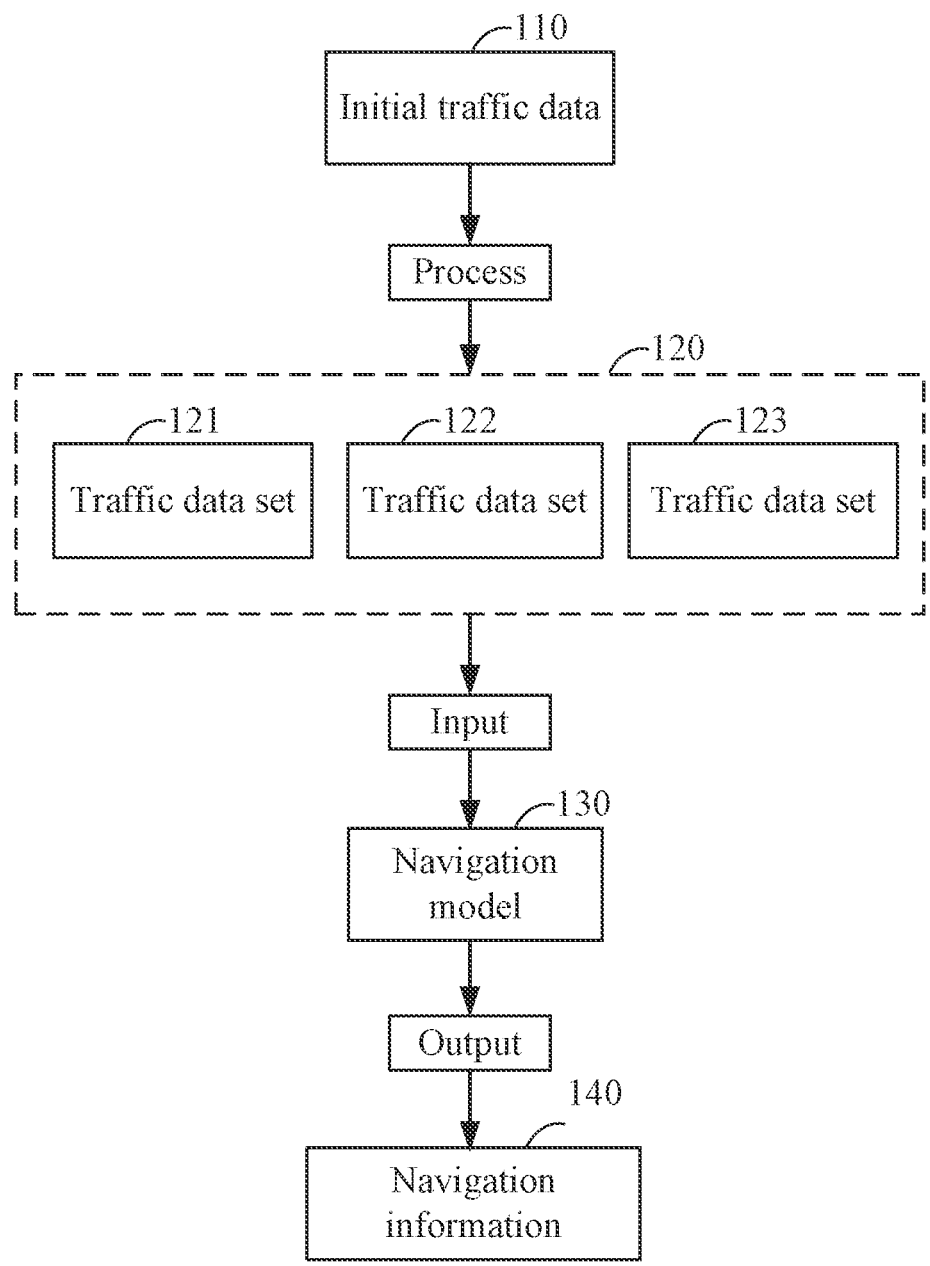
FIG. 1 schematically shows an application scenario of a method of processing traffic data according to embodiments of the present disclosure.

FIG. 1 schematically shows an application scenario of a method of processing traffic data according to embodiments of the present disclosure.

In the application scenario 100 shown in FIG. 1, the method of processing traffic data according to embodiments of the present disclosure may be, for example, performed by an electronic device. The electronic device may include a smart phone, a computer, a server, etc. In one example, the electronic device may include a vehicle computer system, the vehicle computer system is provided with a data processing function.

In embodiments of the present disclosure, the electronic device acquires initial traffic data 110. The initial traffic data 110 is for example, from a plurality of data sources. The plurality of data sources include, but are not limited to, one or more vehicle sensors, one or more servers, and so on. The one or more vehicle sensors include, for example, a positioning sensor, a speed sensor, an image sensor, etc. installed in the vehicle. The one or more servers include, for example, a cloud server, etc., in which plenty of traffic data is stored.

In embodiments of the present disclosure, the electronic device may acquire the initial traffic data 110 for the vehicle form a vehicle sensor, or acquire the initial traffic data 110 from a server. Due to the initial traffic data 110 including a plurality of types of traffic data, the traffic data of these types is mixed and messy, which makes it difficult to analyze the initial traffic data 110 for navigating the vehicle.

Therefore, embodiments of the present disclosure processes the initial traffic data 110 to acquire a traffic data set 120. The traffic data set 120 includes a plurality of traffic data sets 121, 122, 123, and each of the plurality of traffic data sets 121, 122, 123 is traffic data of one type.

After the plurality of traffic data sets 121, 122, 123 are acquired, the plurality of traffic data sets 121, 122, 123 may be input to a navigation model 130 for analysis, so that the navigation model 130 outputs navigation information 140, and the vehicle may be navigated based on the navigation information 140. The navigation model 130 may be a deep learning model.

In embodiments of the present disclosure, the plurality of traffic data sets are acquired by processing the initial traffic data, which facilitates the navigation model to analyze the plurality of traffic data sets, improves the analysis accuracy of the navigation model, and thereby the navigation effect is improved.

According to embodiments of the present disclosure, a method of processing traffic data is provided. In the following, with reference to FIGS. 2-10 combining the application scenario in FIG. 1, the method of processing traffic data according to embodiments of the present disclosure is described.

Figure 2:
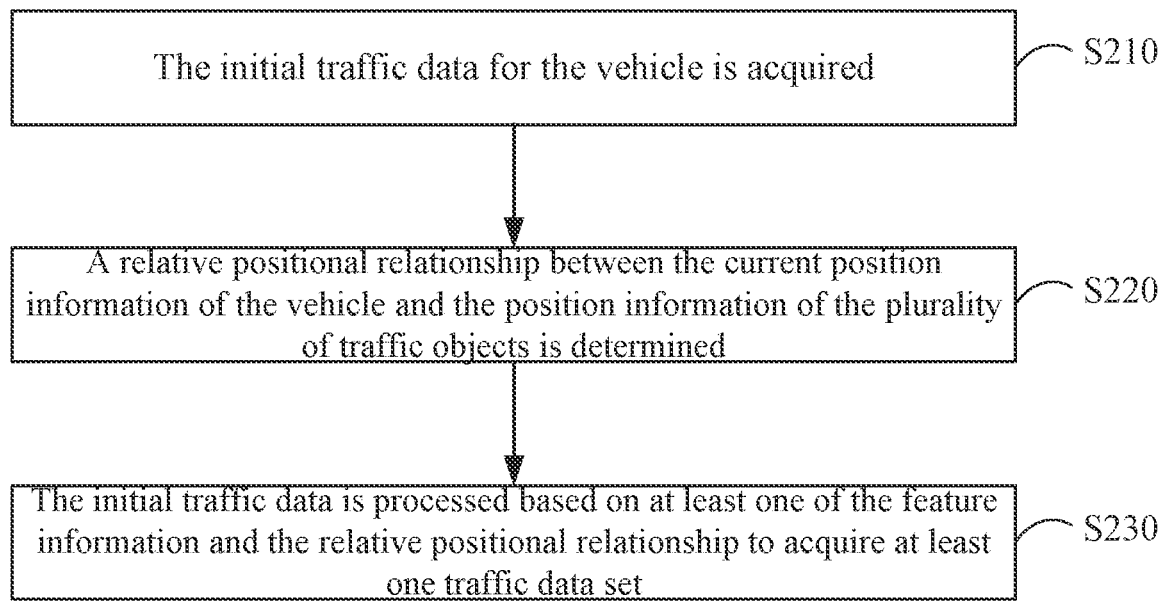
FIG. 2 schematically shows a flowchart of a method of processing traffic data according to embodiments of the present disclosure.

FIG. 2 schematically shows a flowchart of a method of processing traffic data according to embodiments of the present disclosure.

As shown in FIG. 2, the method 200 of processing traffic data according to embodiments of the present disclosure may, for example, include operations S210-S230.

In operation S210, the initial traffic data for the vehicle is acquired. The initial traffic data includes current position information of the vehicle, position information of a plurality of traffic objects and feature information.

In operation S220, a relative positional relationship between the current position information of the vehicle and the position information of the plurality of traffic objects is determined.

In operation S230, the initial traffic data is processed based on at least one selected from: the feature information and/or the relative positional relationship to acquire at least one traffic data set, so as to navigate the vehicle based on the at least one traffic data set.

In embodiments of the present disclosure, the initial traffic data includes, for example, data from the vehicle sensor and data from the server.

The data from the vehicle sensor may include vehicle data, and the vehicle data includes current position information of the vehicle. The data from the server may include road condition data around the vehicle, and the road condition data includes object data of the plurality of traffic objects. The object data includes position information and attribute information, etc., and the attribute information may include identifications of the plurality of traffic objects. The plurality of traffic objects include but are not limited to roads, points of interest, etc. The points of interest include schools, banks, references, gas stations, hospitals, supermarkets, etc.

Schematically, the vehicle may transmit the current position information of the vehicle to the server, and the server transmits the road condition data around the vehicle to the vehicle according to the current position information of the vehicle.

In embodiments of the present disclosure, the initial traffic data may also include feature information, which, for example, characterizes data of certain types. For example, taking the initial traffic data including "the current position of the vehicle is position A" as an example, the feature information of the initial traffic data includes, for example, "the current position of the vehicle". Based on the feature information, the type of the initial traffic data "the current position of the vehicle is position A" may be known.

Due to the initial traffic data including data of a plurality of types, the initial traffic data is mixed and messy, which is not conducive for navigation analysis. Thus, after the initial traffic data is acquired by the vehicle, the relative positional relationship between the current position information of the vehicle and the position information of the plurality of traffic objects may be determined first, and the initial traffic data is processed based on the relative positional relationship and the feature information, so as to acquire a plurality of traffic data sets, the data in each traffic data set is data of the same type.

For example, one traffic data set may include data of the vehicle itself and road data of the current road where the vehicle is located, the data in the traffic data set is highly correlated with the vehicle. Another traffic data set may include road data of a neighboring road adjacent to the current road where the vehicle is located, and the data in the traffic data set is slightly less relevant to the vehicle. Yet another traffic data set may include road data of a road that is far away from the vehicle, and the data in the traffic data set has low relevance to the vehicle.

In embodiments of the present disclosure, by processing the initial traffic data, a plurality of traffic data sets are acquired, and each traffic data set has a different correlation with the vehicle. After the plurality of traffic data sets are acquired, the plurality of traffic data sets may be analyzed and processed in order to navigate the vehicle. Since the plurality of traffic data sets are data of different types, it tends to analyze and process data based on the plurality of traffic data sets, thereby efficiency and accuracy of data analysis and processing is improved, and the effect of navigation for vehicles is improved.

Figure 3:
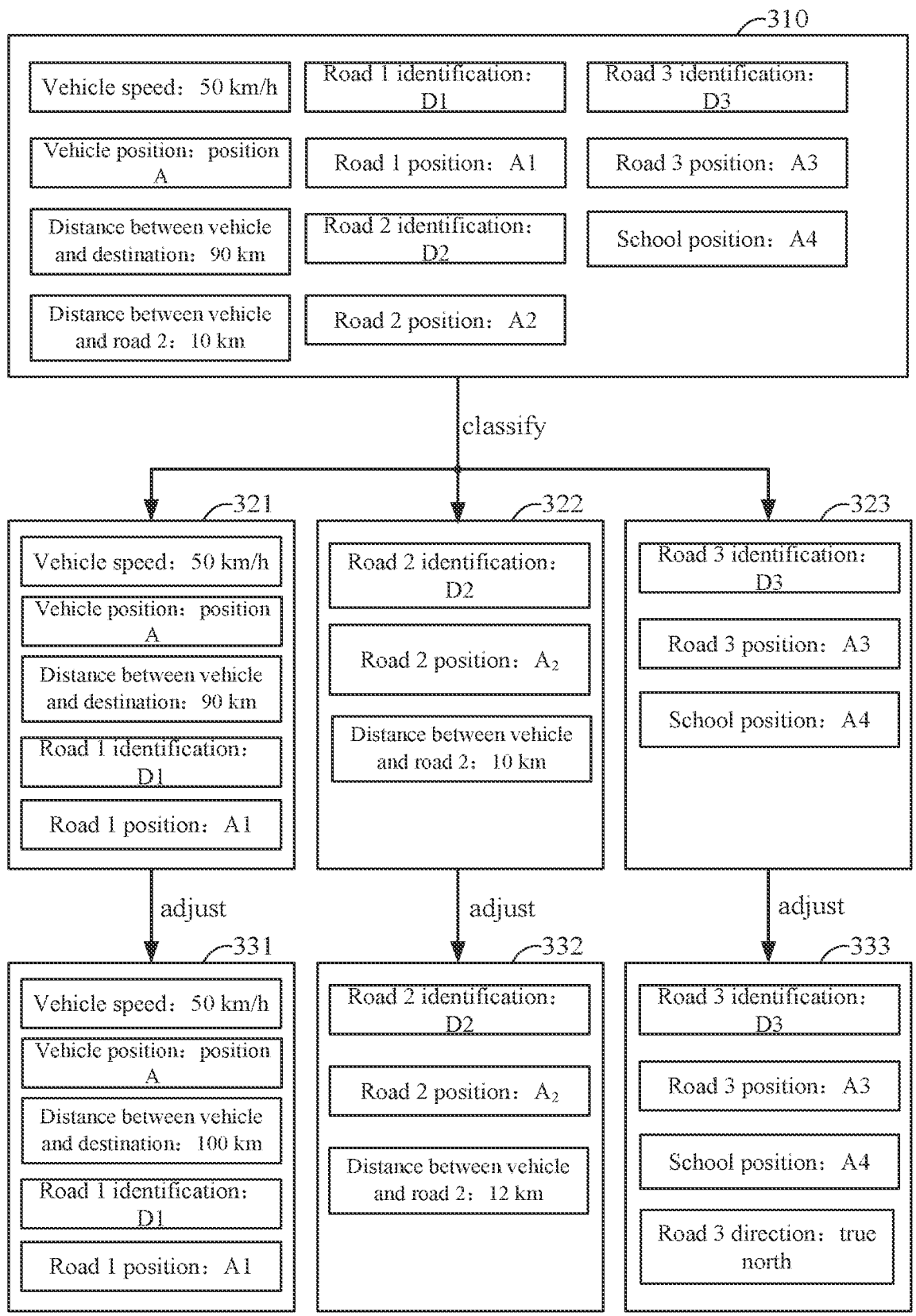
FIG. 3 schematically shows a schematic diagram of a method of processing traffic data according to embodiments of the present disclosure.

FIG. 3 schematically shows a schematic diagram of a method of processing traffic data according to embodiments of the present disclosure.

As shown in FIG. 3, for example, an initial traffic data 310 is processed to acquire a plurality of traffic data sets. The plurality of traffic data sets include, for example, a first traffic data set 331, a second traffic data set 332, a third traffic data set 333.

Specifically, the initial traffic data 310 is classified, so as to divide the initial traffic data 310 into a first category 321, a second category 322 and a third category 323.

The first category 321 includes, for example, data of the vehicle itself and road data of the current road where the vehicle is located, etc. The second category 322 includes, for example, road data of a neighboring road adjacent to the current road where the vehicle is located. The third category 323 includes, for example, road data of a road far away from the vehicle or data of a point of interest far away from the vehicle.

In embodiments of the present disclosure, the first category 321 includes, for example, "vehicle speed: 50 km/h", "vehicle position: position A", "distance between vehicle and destination: 90 km", "road 1 identification: D1", and "road 1 position: $A_1$". The data of the first category 321 includes data such as the speed or position of the vehicle itself, as well as the road data of the current road (road 1) where the vehicle is located, and the road data includes road identifications or road positions. Based on the position of the vehicle and the position of the road 1, it may be known that the vehicle is close to the road 1, that is, the vehicle is located on the road 1, so that the related data of the road 1 is classified into the first category 321.

In embodiments of the present disclosure, the second category 322 includes, for example, "road 2 identification: D2", "road 2 position: $A_2$", and "distance between vehicle and road 2: 10 km". The second category 322 includes the road data of a neighboring road (road 2) adjacent to the current road (road 1) where the vehicle is located, and the road data includes road identifications, road positions, distances between the vehicle and the road, and so on. It may be determined that the road 2 is adjacent to the road 1 based on the positions of the road 1 and the road 2 so as to classify the related data of the road 2 into the second category 322.

In embodiments of the present disclosure, the third category 323 includes, for example, "road 3 identification: D3", "road 3 position: $A_3$", and "school position: $A_4$". The third category 323 includes road data of a road (road 3) far from the vehicle or data of a point of interest (school) far from the vehicle. The point of interest (school) may be for example, located on both sides of the road 3. It may be determined that the road 3 is far away from the vehicle based on the positions of the road 3 and the vehicle, so that the related data of the road 3 and the related data of the point of interest on both sides of the road 3 are classified into the third category 323.

After classifying the initial traffic data to acquire the first category 321, the second category 322, and the third category 323, each category may be processed to acquire the first traffic data set 331 corresponding to the first category 321, the second traffic data set 332 corresponding to the second category 322, and the third traffic data set 333 corresponding to the third category 323.

For the first category 321, the data in the category may be adjusted, and the adjusted first category 321 is used as the first traffic data set 331. For example, when it is determined that "distance between vehicle and destination: 90 km" in the first category 321 is wrong, the "distance between vehicle and destination: 90 km" may be adjusted to "distance between vehicle and destination: 100 km", and the first traffic data set 331 includes the "distance between vehicle and destination: 100 km".

For the second category 322, the data in the category may be adjusted, and the adjusted second category 322 is used as the second traffic data set 332. For example, when it is determined that "distance between vehicle and road 2: 10 km" in the second category 322 is wrong, the "distance between vehicle and road 2: 10 km" may be adjusted to "distance between vehicle and road 2: 12 km", and the second traffic data set 332 includes the "distance between vehicle and road 2: 12 km".

For the third category, the data in the category may be added, and the added data and the data in the third category 323 are used together as the third traffic data set 333. For example, the added data is "road 3 direction: true north", and the third traffic data set 333 includes the "road 3 direction: true north".

In embodiments of the present disclosure, the initial traffic data is classified and processed to acquire a plurality of traffic data sets. The data in the plurality of traffic data sets has high accuracy and comprehensive data information, which facilitates the plurality of traffic data sets to improve accuracy of navigation analysis when performing navigation analysis, and thereby the navigation effect of the vehicle is improved.

In the following, with reference to FIGS. 4-6 combining the schematic diagram of FIG. 3, how to acquire the first traffic data set, the second traffic data set and the third traffic data set is described.

Figure 4:
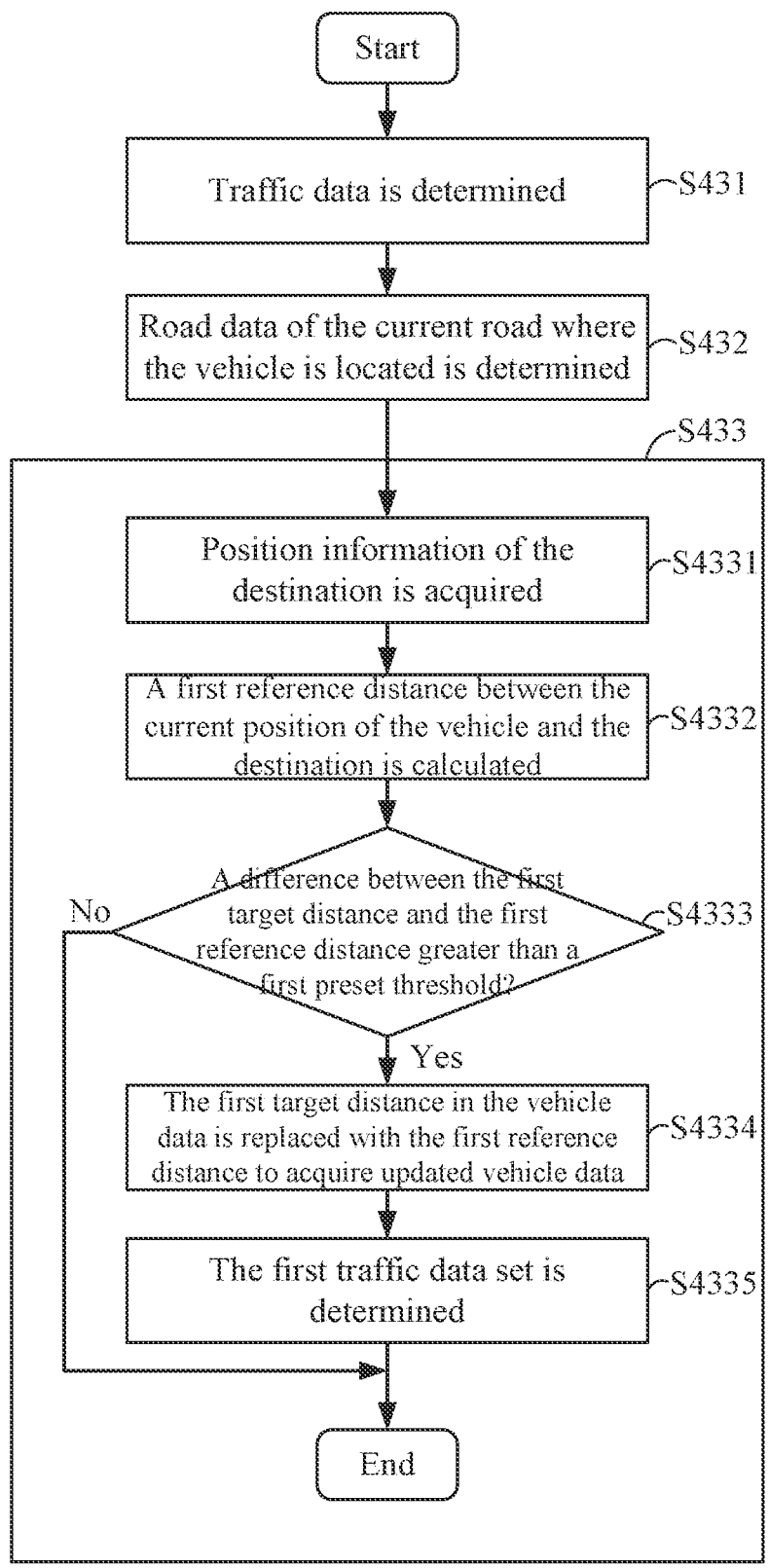
FIG. 4 schematically shows a flowchart of acquiring a first traffic data set according to embodiments of the present disclosure.

FIG. 4 schematically shows a flowchart of acquiring a first traffic data set according to embodiments of the present disclosure.

As shown in FIG. 4, the initial traffic data is processed based on at least one selected from the feature information and/or the relative positional relationship of the initial traffic data to acquire the first traffic data set, which may, for example, include operations S431-S433, and the operation S433 includes, for example, operations S4331-S4335.

In embodiments of the present disclosure, the feature information includes, for example, a keyword. The feature information may include a plurality of preset keywords.

In operation S431, traffic data with the keyword is determined from the initial traffic data as the vehicle data.

In embodiments of the present disclosure, the vehicle data is acquired through natural language processing technology. For example, the preset keyword include "vehicle speed", "vehicle position", "distance between vehicle and destination", etc. Based on the natural language processing technology, the traffic data with these keywords is determined from the initial traffic data to be used as the vehicle data. For example, the determined vehicle data includes "vehicle speed: 50 km/h", "vehicle position: position A", "distance between vehicle and destination: 90 km", etc. The vehicle data may also include a head direction, the head direction characterizes a current travelling direction of the vehicle.

In operation S432, road data of the current road where the vehicle is located is determined from the initial traffic data.

For example, the initial traffic data includes road data of road 1, road data of road 2, and road data of road 3. Each road has position information, and the relative positional information characterizes, for example, the relative position between the vehicle and each road. Based on the relative position, the current road of the vehicle is determined from a plurality of roads. For example, the current road where the vehicle is located is road 1, then the road data of the current road (road 1) is acquired. The road data of the current road includes, for example, "road 1 identification: D1", "road 1 position: $A_1$", etc.

In operation S433, the first traffic data set is determined based on the vehicle data and the road data of the current road.

In one example, the vehicle data and the road data of the current road may be directly used as the first traffic data set. Alternatively, the vehicle data and the road data of the current road may be processed to acquire the first traffic data set. Specifically, the vehicle data and the road data of the current road may be adjusted, and the adjusted data is used as the first traffic data set, the detail of which is referred to operations S4331-S4335.

In embodiments of the present disclosure, the vehicle data includes a first target distance and current position information of the vehicle, and the first target distance is a distance between the current position of the vehicle and the destination. For example, if the vehicle data includes "distance between vehicle and destination: 90 km" and "vehicle position: position A", then the first target distance is 90 km, and the current position information of the vehicle is position A.

In operation S4331, position information of the destination is acquired. The position information of the destination may be acquired from the initial traffic data, for example, the position information of the destination may be position B.

In operation S4332, a first reference distance between the current position of the vehicle and the destination is calculated based on the current position information of the vehicle and the position information of the destination. For example, based on the position A and the position B, the distance between the position A and the position B is determined as the first reference distance. For example, the first reference distance is 100 km. The first reference distance is a distance calculated in real time, and accuracy of the distance is relatively high.

In operation S4333, it is determined whether a difference between the first target distance and the first reference distance is greater than a first preset threshold or not. If the difference between the first target distance and the first reference distance is greater than the first preset threshold, then operation S4334 is performed. If the difference between the first target distance and the first reference distance is not greater than the first preset threshold, then the operations end.

In operation S4334, the first target distance in the vehicle data is replaced with the first reference distance to acquire updated vehicle data, in a case where the difference between the first target distance and the first reference distance is greater than the first preset threshold.

For example, assuming that the first preset threshold is 5 km, the difference between the first target distance 90 km and the first reference distance 100 km is 10 km, which is greater than the first preset threshold 5 km. This indicates the first target distance in the initial traffic data is wrong, so the first target distance 90 km in the vehicle data may be replaced with 100 km. The updated vehicle data includes, for example, "distance between vehicle and destination: 100 km".

In operation S4335, the updated vehicle data and the road data of the current road are determined as the first traffic data set.

It should be understood that in embodiments of the present disclosure, the vehicle data is determined through keywords, and the current road where the vehicle is located is determined based on the relative position of the vehicle and the road, and then the vehicle data and the road data of the current road are processed to acquire the first traffic data set. Data processing includes, for example, adjusting the vehicle data. It may be seen that through the technical solution of embodiments of the present disclosure, the data accuracy of the first traffic data set is relatively high, which is convenient for improving the accuracy of the navigation analysis, and thereby improving the navigation effect of the vehicle when performing navigation analysis based on the first traffic data set.

In embodiments of the present disclosure, the first traffic data set may also include number of lanes of the current road, a direction of each lane, a current state of the vehicle, and so on. The current state of the vehicle includes a navigation state, a cruise state, and a parking state of the vehicle. In addition, the first traffic data set may also include road identifications of all roads within a preset distance (for example, 300 m) in front of the vehicle. The road identifications include road names and a road feature point of each road. The road feature point characterizes, for example, a curved shape of each road.

Figure 5:
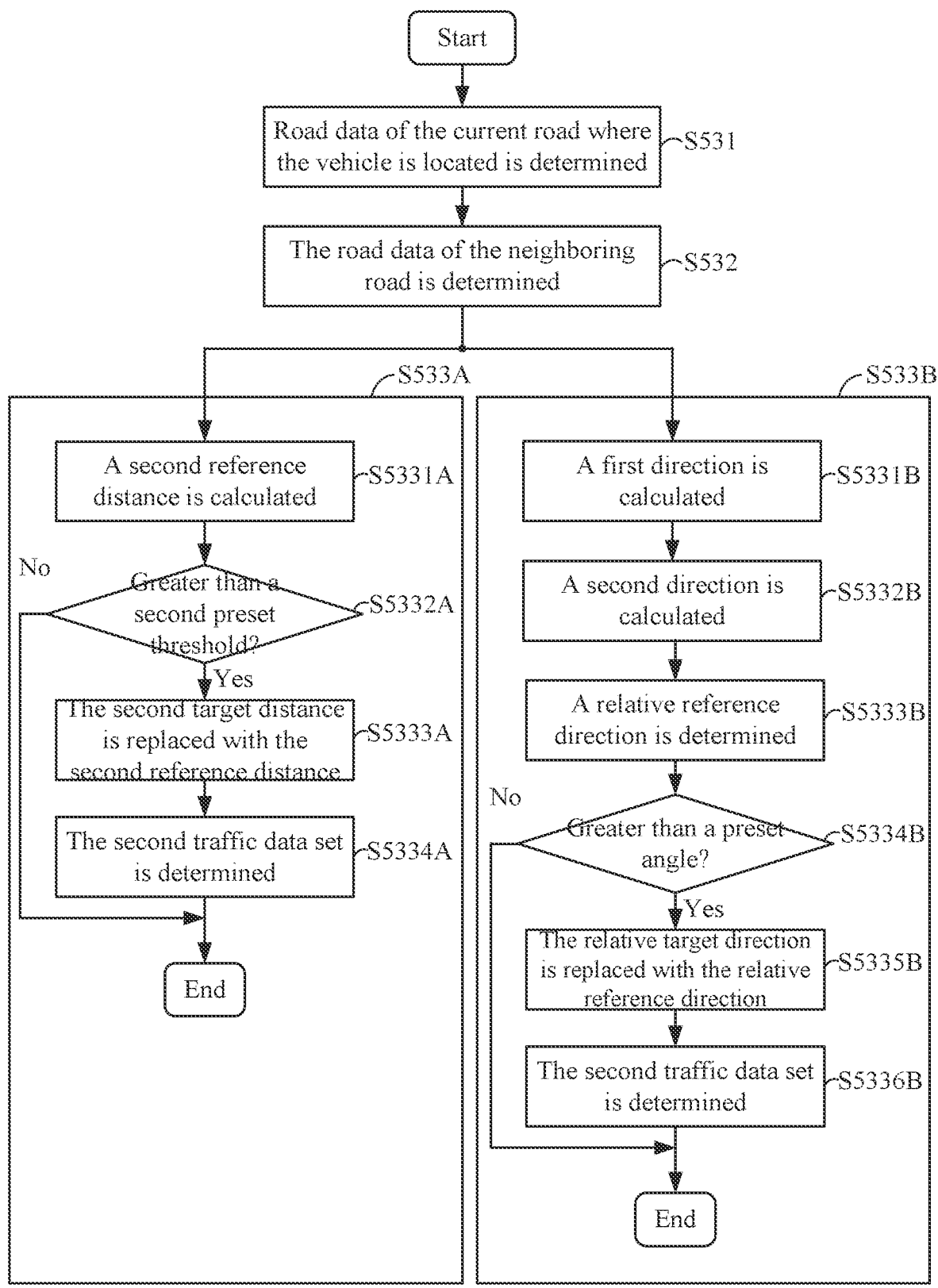
FIG. 5 schematically shows a flowchart of acquiring a second traffic data set according to embodiments of the present disclosure.

FIG. 5 schematically shows a flowchart of acquiring a second traffic data set according to embodiments of the present disclosure.

As shown in FIG. 5, the initial traffic data is processed based on at least one selected from the feature information and/or the relative positional relationship of the initial traffic data to acquire the second traffic data set, which may, for example, include operations S531-S533. The operation S533 includes, for example, operation S533A and/or operation S533B. The operation S533A includes, for example, operations S5331A-S5334A, and the operation S533B includes, for example, operations S5331B-S5336B.

In embodiments of the present disclosure, the plurality of traffic objects include a plurality of roads, and the initial traffic data includes road data of the plurality of roads.

In operation S531, road data of the current road where the vehicle is located is determined from the road data of the plurality of roads, based on the relative positional relationship.

In operation S532, the road data of the neighboring road is determined from the road data of the plurality of roads based on the relative positional relationship and the road data of the current road, and the positional relationship between the neighboring road and the current road meets a first preset positional relationship.

For example, the initial traffic data includes the road data of road 1, the road data of road 2, and the road data of road 3. Each road has position information, and the relative positional information characterizes, for example, the relative position between the vehicle and each road. Based on the relative position, the current road of the vehicle is determined from the plurality of roads. For example, the current road where the vehicle is located is road 1, then the road data of the current road (road 1) is acquired. The road data of the current road includes, for example, "road 1 identification: D1", "road 1 position: $A_1$", etc.

The relative positional relationship characterizes the relative position among the plurality of roads. Based on the relative positional relationship, the neighboring road adjacent to the current road may be determined. The first preset positional relationship includes, for example, that the neighboring road is directly connected to the current road, and the neighboring road is the road to which the vehicle will travel from the current road.

Exemplarily, the neighboring road is road 2, and the road data of the neighboring road includes, but is not limited to, road identification, road position, and road feature point information. The road feature point characterizes, for example, a curved shape of the road. In an example, the road data of the neighboring roads may include "road 2 identification: D2", "road 2 position: $A_2$", "distance between vehicle and road 2: 10 km", etc.

In operation S533, the second traffic data set is determined based on at least one selected from the road data of the neighboring road and/or the current position information of the vehicle.

In an example, the road data of the neighboring road may be directly used as the second traffic data set.

In an example, the road data of the neighboring road may be adjusted based on the current position information of the vehicle, and the adjusted road data of the neighboring road is used as the second traffic data set. The detail of which is referred to the following operations S533A or operation S533B.

In an example, adjusting the road data of the neighboring road includes adjusting distance data in the road data. The detail of which is referred to operation S533A. The operation S533A includes, for example, operations S5331A-S5334A.

In embodiments of the present disclosure, the road data of the neighboring road includes a second target distance, and the second target distance is a distance between the current position of the vehicle and the feature point of the neighboring road. For example, the road data of the neighboring road includes "distance between vehicle and road 2: 10 km", and the second target distance is 10 km.

In operation S5331A, a second reference distance between the current position of the vehicle and the feature point of the neighboring road is calculated based on the current position information of the vehicle and the position information of the feature point of the neighboring road.

The current position information of the vehicle may be acquired, for example, from the initial traffic data. The neighboring road includes, for example, a plurality of feature points, and the second reference distance is, for example, the distance between the current position information of the vehicle and a specific feature point. The specific feature point is, for example, a feature point closest to the vehicle among the plurality of feature points. In other words, the specific feature point is the first feature point the vehicle passes when the vehicle travels to the neighboring road.

Exemplarily, the calculated second reference distance is, for example, 12 km. The second reference distance is a distance calculated in real time, and accuracy of the distance is relatively high.

In operation S5332A, it is determined whether a difference between the second target distance and the second reference distance is greater than a second preset threshold or not. If the difference between the second target distance and the second reference distance is greater than the second preset threshold, then operation S5333A is performed If the difference between the second target distance and the second reference distance is not greater than the second preset threshold, then the operations end.

In operation S5333A, the second target distance in the road data of the neighboring road is replaced with the second reference distance to acquire an updated road data of the neighboring road, in a case where the difference between the second target distance and the second reference distance is greater than the second preset threshold.

For example, assuming that the second preset threshold is 1 km, the difference between the second target distance 10 km and the second reference distance 12 km is 2 km, which is greater than the second preset threshold 1 km. This indicates the second target distance in the initial traffic data is wrong, so the second target distance 10 km in the road data of the neighboring road may be replaced with 12 km. The acquired updated road data of the neighboring road includes, for example, "distance between vehicle and road 2: 12 km".

In operation S5334A, the updated road data of the neighboring road is determined as the second traffic data set.

It should be understood that embodiments of the present disclosure acquires the second traffic data set by processing the road data of neighboring road, and data processing includes, for example, adjusting the distance in the road data. It may be seen that through the technical solution of embodiments of the present disclosure, data accuracy of the second traffic data set is relatively high, which is convenient for improving the accuracy of navigation analysis, and thereby improving the navigation effect of the vehicle when performing navigation analysis based on the second traffic data set.

In an example, adjusting the road data of the neighboring road includes adjusting direction data in the road data. The detail of which is referred to operation S533B. The operation S533B includes, for example, operations S5331B-S5336B.

In embodiments of the present disclosure, the road data of the neighboring road includes a relative target direction of the neighboring road, and the relative target direction characterizes, for example, a direction of the neighboring road relative to the current road. For example, the road data of the neighboring road includes "direction of road 2 relative to road 1: true north". The relative target direction is, for example, true north.

In operation S5331B, a first direction from the current position of the vehicle to the first feature point of the neighboring road is calculated based on the current position information of the vehicle and position information of the first feature point of the neighboring road.

In operation S5332B, a second direction from the first feature point to a second feature point of the neighboring road is calculated based on the position information of the first feature point of the neighboring road and position information of the second feature point of the neighboring road.

The neighboring road includes a plurality of feature points. The first feature point is, for example, the feature point closest to the vehicle among the plurality of feature points. In other words, the first feature point is the first feature point the vehicle passes when the vehicle travels to the neighboring road. The second feature point is a feature point in the middle of the road among the plurality of feature points.

In operation S5333B, a relative reference direction between the first direction and the second direction is determined based on the first direction and the second direction.

For example, the first direction is true north, and the second direction is a direction 15° east of north, and the relative reference direction between the first direction and the second direction is, for example, "15° east of north". The relative reference direction is a direction calculated in real time, and accuracy of the direction is high.

In operation S5334B, it is determined whether an angle between the relative target direction and the relative reference direction is greater than a preset angle or not. If the angle between the relative target direction and the relative reference direction is greater than the preset angle, then operation S5335B is performed. If the angle between the relative target direction and the relative reference direction is not greater than the preset angle, then the operations end.

In operation S5335B, the relative target direction in the road data of the neighboring road is replaced with the relative reference direction to acquire an updated road data of the neighboring road in a case where the angle between the relative target direction and the relative reference direction is greater than the preset angle.

Assuming that the preset angle is 10°, the angle between the relative target direction "true north" and the relative reference direction "15° east of north" is 15°, which is greater than the preset angle 10°. This indicates the relative target direction in the initial traffic data is wrong, so the relative target direction "true north" in the road data of the neighboring road may be replaced with "15° east of north". The acquired updated road data of the neighboring road includes, for example, "direction of road 2 relative to road 1: 15° east of north".

In operation S5336B, the updated road data of the neighboring road is determined as the second traffic data set.

It should be understood that embodiments of the present disclosure acquires the second traffic data set by processing the road data of the neighboring road, and the data processing includes, for example, adjusting the direction in the road data. It may be seen that through the technical solution of embodiments of the present disclosure, the data accuracy of the second traffic data set is relatively high, which is convenient for improving the accuracy of navigation analysis, and thereby improving the navigation effect of the vehicle when performing navigation analysis based on the second traffic data set.

Figure 6:
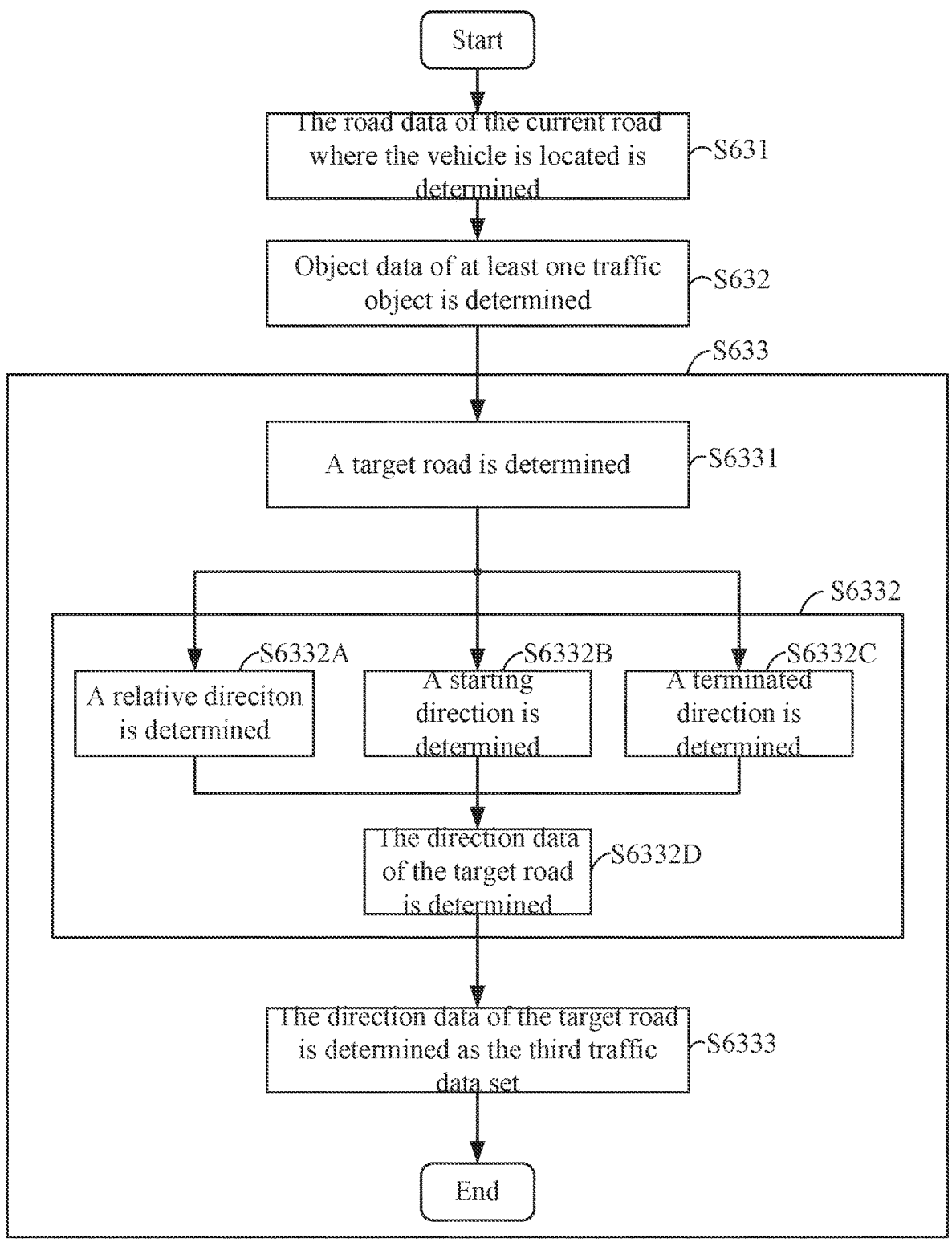
FIG. 6 schematically shows a flowchart of acquiring a third traffic data set according to embodiments of the present disclosure.

FIG. 6 schematically shows a flowchart of acquiring a third traffic data set according to embodiments of the present disclosure.

As shown in FIG. 6, the initial traffic data is processed based on at least one selected from the feature information and/or the relative positional relationship of the initial traffic data to acquire the third traffic data set, which may, for example, include operations S631-S633. The operation S633 includes, for example, operations S6331-S6333. The operation S6332 includes, for example, operations S6332A-S6332D.

In embodiments of the present disclosure, the initial traffic data includes object data of each traffic object, and the traffic object includes, for example, a road or a point of interest.

In operation S631, object data of a traffic object is determined from the object data of the plurality of objects as the road data of the current road where the vehicle is located, based on the relative positional relationship.

In operation S632, object data of at least one traffic object is determined from the object data of the plurality of objects based on the relative positional relationship and the road data of the current road, and the positional relationship between the at least one traffic object and the current road meets a second preset positional relationship.

In embodiments of the present disclosure, the relative positional relationship characterizes the relative position among the plurality of traffic objects. Based on the relative positional relationship, at least one traffic object far away from the current road may be determined, and the at least one traffic object far away from the current road includes, for example, a long-distance road and points of interest on both sides of the long-distance road. The second preset positional relationship includes, for example, that a distance between the long-distance road and the current road is relatively long, that is, there is at least one other road between the long-distance road and the current road.

Exemplarily, the long-distance road is, for example, road 3, and road data of the long-distance road includes, but is not limited to, road identifications, road positions, and road feature point information. The road feature point, for example, characterizes a curved shape of the road. For example, the road data of the long-distance road includes "road 3 identification: D3", "road 3 position: $A_3$," and so on. The points of interest on both sides of the long-distance road include, for example, schools, and the point of interest data include, for example, "school position: $A_4$"

In operation S633, the third traffic data set is determined based on the object data of the at least one traffic object.

In an example, the object data of the at least one traffic object may be directly used as the third traffic data set. For example, the data of the long-distance road and the data of the points of interest on both sides of the long-distance road are used as the third traffic data set.

In an example, object data for the at least one traffic object may be added based on the existing object data of the at least one traffic object, and the existing object data and the newly added object data may be used together as the third traffic data set. The detail of which is referred to the following operations S6331 to S6333.

In embodiments of the present disclosure, the at least one traffic object includes, for example, at least one road, the object data of the traffic objects includes road data, and the road data includes feature point of the roads.

In operation S6331, a target road is determined from the at least one road. The target road may be any one of the at least one road.

In operation S6332, a direction data of the target road is determined based on the feature point of each of the at least one road. The direction data is, for example, the newly added data for the target road.

In operation S6333, the direction data of the target road is determined as the third traffic data set. That is, the direction data of the target road does not exist in the initial traffic data, the direction data of the target road is added, and the newly added direction data of the target road is used as the third traffic data set.

Operation S6332 includes, for example, operations S6332A-S6332D.

In embodiments of the present disclosure, the at least one road includes a plurality of roads.

In operation S6332A, a direction of the target road and a direction of a first road are determined based on the feature point of each of the at least one road, and a relative direction between the direction of the target road and the direction of the first road is determined. The first road is a road adjacent to the target road in the plurality of roads.

In operation S6332B, a direction from a first feature point of the first road to a starting feature point of the target road is determined as a starting direction. The first road is, for example, an entry road, that is, the vehicle may travel from the first road to the target road. The first feature point is, for example, the first feature point the vehicle passes when traveling on the first road.

In operation S6332C, a direction from a terminated feature point of the target road to a second feature point of a second road is determined as a terminated direction. The second road is a road adjacent to the target road in the plurality of roads. The second road is, for example, an exit road, that is, the vehicle may travel from the target road to the second road. The second feature point is, for example, the last feature point the vehicle passes when traveling on the second road.

In operation S6332D, the relative direction, the starting direction, and the terminated direction are used as the direction data of the target road.

It should be understood that embodiments of the present disclosure acquires the third traffic data set by processing the object data, and the data processing includes, for example, process of adding object data. It may be seen that through the technical solution of embodiments of the present disclosure, the data of the third traffic data set is enriched, which is convenient for improving the accuracy of the navigation analysis, and thereby improving the navigation effect of the vehicle when performing navigation analysis based on the third traffic data set.

In the following, referring to FIGS. 7-9, how to acquire the direction data is described.

Figure 7:
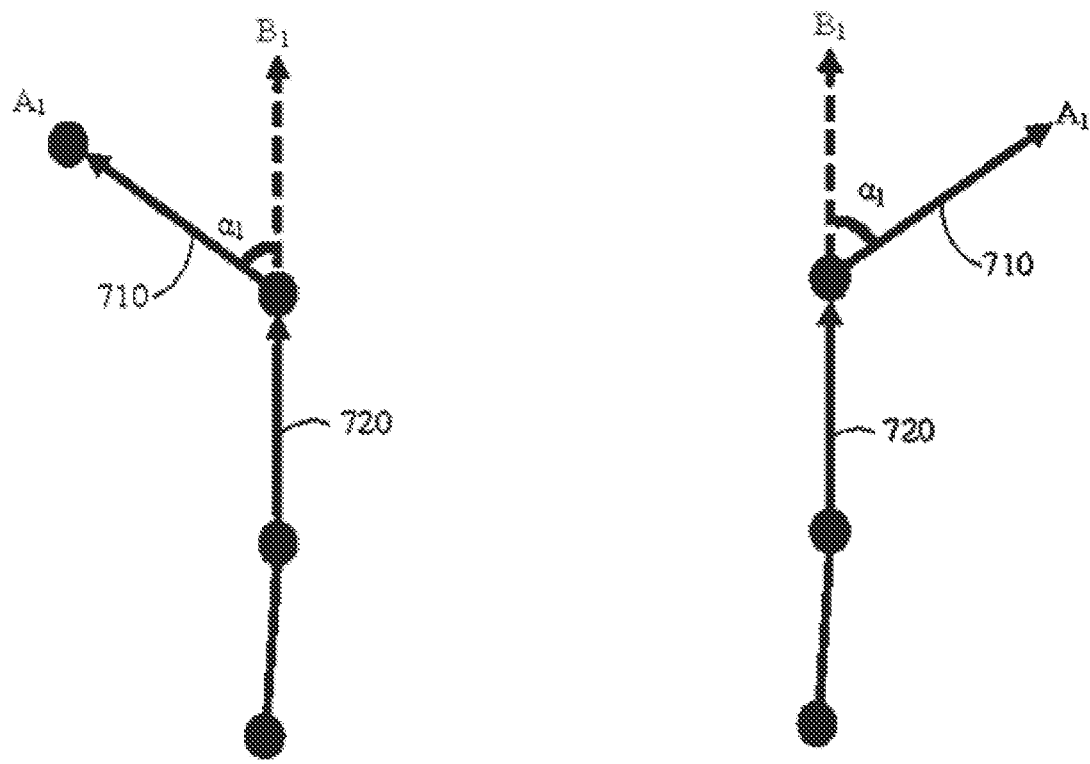
FIG. 7 schematically shows a schematic diagram of acquiring a relative direction according to embodiments of the present disclosure.

FIG. 7 schematically shows a schematic diagram of acquiring a relative direction according to embodiments of the present disclosure.

As shown in FIG. 7, a direction of the target road 710 is $A_1$, a direction of the first road 720 is $B_1$, and a relative direction between $A_1$ and $B_1$ may be represented by an angle $\alpha_1$. The counterclockwise angle $\alpha_1$ is negative (as shown in the left one of FIG. 7), and the clockwise angle $\alpha_1$ is positive (as shown in the right one of FIG. 7).

Figure 8:
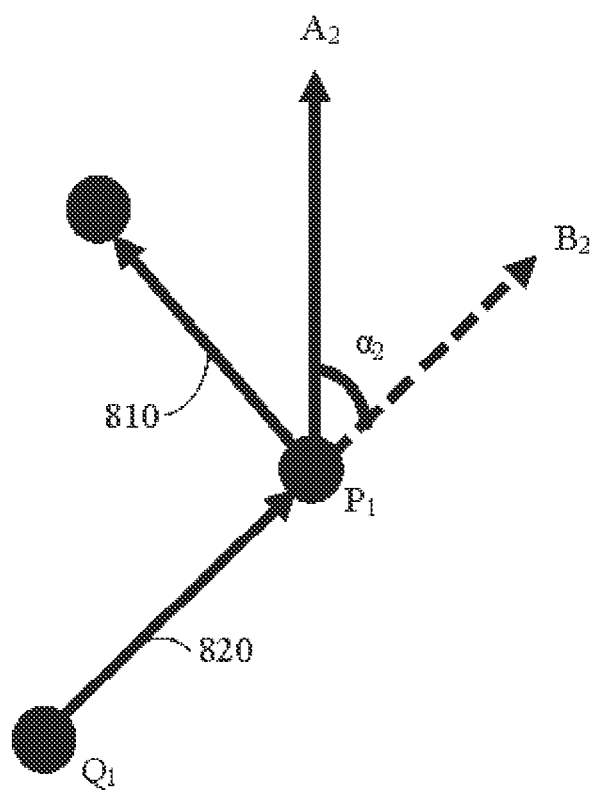
FIG. 8 schematically shows a schematic diagram of acquiring a starting direction according to embodiments of the present disclosure.

FIG. 8 schematically shows a schematic diagram of acquiring a starting direction according to embodiments of the present disclosure.

As shown in FIG. 8, the starting feature point of the target road 810 is feature point $P_1$, the first feature point of the first road 820 is feature point $Q_1$, a direction from the first feature point $Q_1$ of the first road 820 to the starting feature point $P_1$ of the target road 810 is determined as the starting direction $B_2$, the starting direction $B_2$ may be represented by angle $\alpha_2$, the angle $\alpha_2$ is for example, an angle between the starting direction $B_2$ and the true north direction $A_2$, and the clockwise angle is positive.

Figure 9:
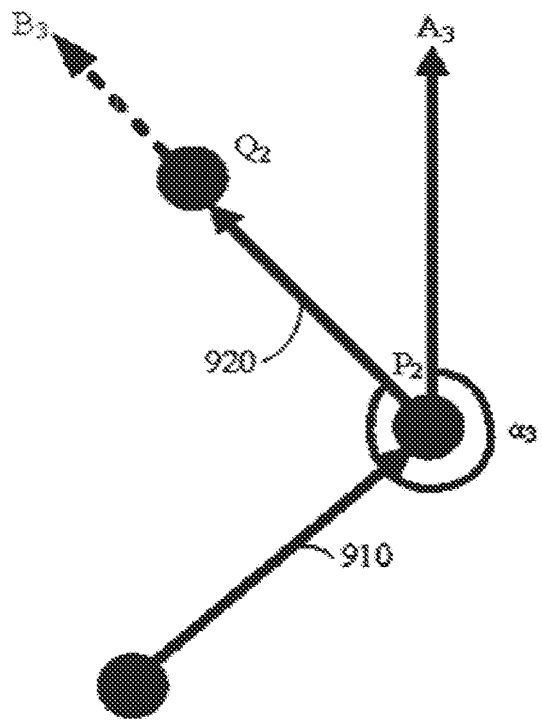
FIG. 9 schematically shows a schematic diagram of acquiring a terminated direction according to embodiments of the present disclosure.

FIG. 9 schematically shows a schematic diagram of acquiring a terminated direction according to embodiments of the present disclosure.

As shown in FIG. 9, the terminated feature point of the target road 910 is feature point $P_2$, the second feature point of the second road 920 is feature point $Q_2$, a direction from the terminated feature point $P_2$ of the target road 910 to the second feature point $Q_2$ of the second road 920 is determined as the terminated direction $B_3$, the terminated direction $B_3$ may be represented by angle $\alpha_3$, the angle $\alpha_3$ may be an angle between the terminated direction $B_3$ and the true north direction $A_3$, and the clockwise angle is positive.

Figure 10:
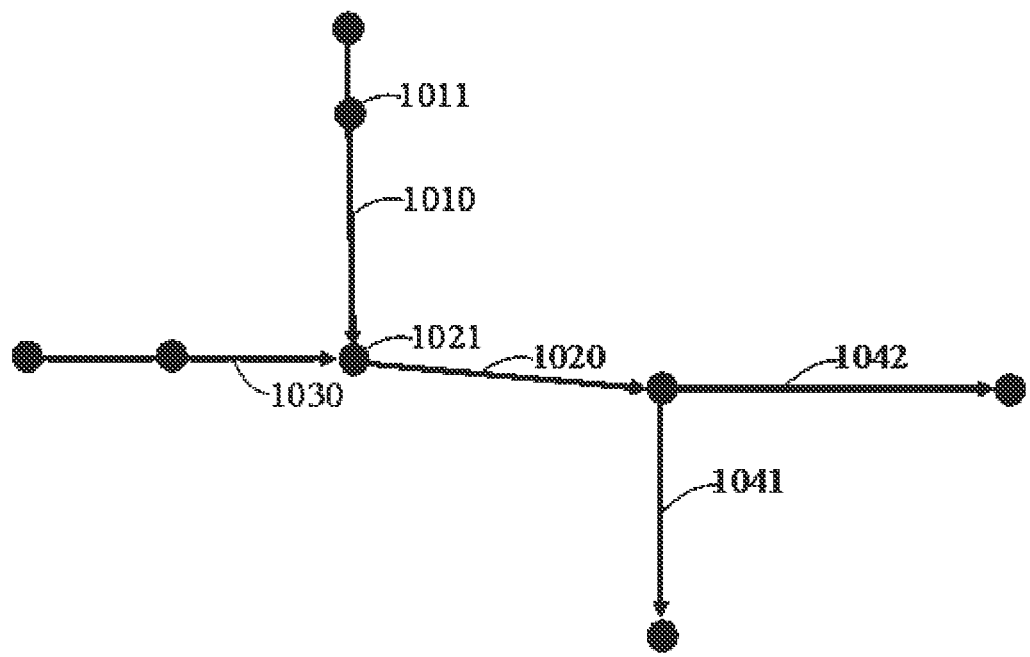
FIG. 10 schematically shows a schematic diagram of neighboring roads according to embodiments of the present disclosure.

FIG. 10 schematically shows a schematic diagram of neighboring roads according to embodiments of the present disclosure.

As shown in FIG. 10, in addition to a road 1020, directly connected to the current road 1010, to which the vehicle will travel from the current road 1010, the neighboring road may also include an entry road 1030 and exiting roads 1041, 1042.

In addition to road data of the road 1020, the second traffic data set may also include road data of the entry road 1030 and road data of the exit roads 1041, 1042.

Specifically, a position 1011 of the current road 1010 is, for example, the position of the vehicle. The road 1020 includes a feature point 1021, and the feature point 1021 is, for example, the first feature point of the road 1020. There are a plurality of feature points between the position 1011 and the feature point 1021, and each feature point has position information. The second traffic data set also includes, for example, position information and identification information of the feature point 1021, and position information of the plurality of feature points between the position 1011 and the feature point 1021. In one example, the identification of the feature point 1021 is, for example, represented by the identification of the road 1020.

The second reference distance mentioned above is, for example, a distance between the position 1011 and the feature point 1021.

The second traffic data set may also include intersection data between the position 1011 and the feature point 1021, and the intersection data includes intersection identification and intersection position. The second traffic data set may also include a relative angle or direction between the entering road and the exiting road.

The second traffic data set may also include numbers of lanes and road identification of the entering road, and number of lanes and road identification of the exiting road. An end point of the entering road and starting point of the road 1020 is a feature point, and a starting point of the exiting road and end point of the road 1020 is a feature point.

The second traffic data set may also include a plurality of feature points in each of the entering road and the exit roads.

It should be understood that each data in the second traffic data set may be acquired from the initial traffic data. For example, natural language processing technology may be used to process the initial traffic data to acquire data with preset keywords in the initial traffic data as the second traffic data set.

In embodiments of the present disclosure, the third traffic data set includes the object data of the plurality of traffic objects, and the traffic objects include roads and points of interest. Specifically, the third traffic data set includes the identification, length, road type, etc. of each road. The road type includes highway, urban expressway, national road, provincial road, county road, township road, other road, ninth class road, ferry, pedestrian road, etc. The third traffic data set also includes numbers of lanes, lane direction, and road passage permit identifications of each road, and so on. The road passage permit identifications include forward passage, reverse passage, two-way passage, etc. The third traffic data set may also include a plurality of feature points and zebra crossing feature points of each road, and so on.

The third traffic data set also includes types of the points of interest, distances between the points of interest and the vehicle, detailed addresses of the points of interest, consumption prices of the points of interest, user evaluation information on the points of interest, and so on. The types of the points of interest include gas stations, restaurants, hotels, etc.

It should be understood that each data in the third traffic data set may be acquired from the initial traffic data. For example, the natural language processing technology may be used to process the initial traffic data to acquire the data with preset keywords in the initial traffic data as the third traffic data set.

Figure 11:
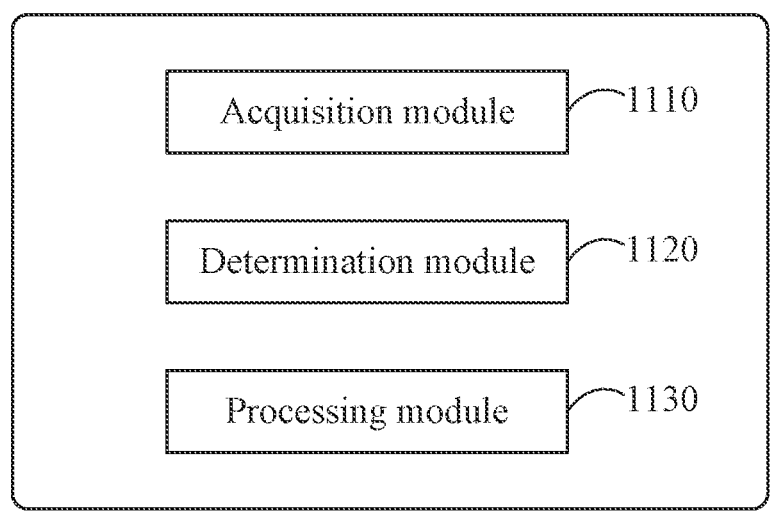
FIG. 11 schematically shows a block diagram of an apparatus of processing traffic data according to embodiments of the present disclosure.

FIG. 11 schematically shows a block diagram of an apparatus of processing traffic data according to embodiments of the present disclosure.

As shown in FIG. 11, the apparatus 1100 of processing traffic data according to embodiments includes, for example, an acquisition module 1110, a determination module 1120 and a processing module 1130.

The acquisition module 1110 may be used to acquire the initial traffic data for the vehicle, and the initial traffic data includes the current position information of the vehicle, the position information of the plurality of traffic objects and the feature information. According to embodiments of the present disclosure, the acquisition module 1110 may, for example, perform the operation S210 described above with reference to FIG. 2, which will not be repeated here.

The determination module 1120 may be used to determine the relative positional relationship between the current position information of the vehicle and the position information of the plurality of traffic objects. According to embodiments of the present disclosure, the determination module 1120 may, for example, perform the operation S220 described above with reference to FIG. 2, which will not be repeated here.

The processing module 1130 may be used to process the initial traffic data based on at least one selected from the feature information and/or the relative positional relationship to acquire at least one traffic data set, so as to navigate the vehicle based on the at least one traffic data set. According to embodiments of the present disclosure, the processing module 1130 may, for example, perform the operation S230 described above with reference to FIG. 2, which will not be repeated here.

According to embodiments of the present disclosure, the present disclosure also provides an electronic device, a readable storage medium, and a computer program product.

Figure 12:
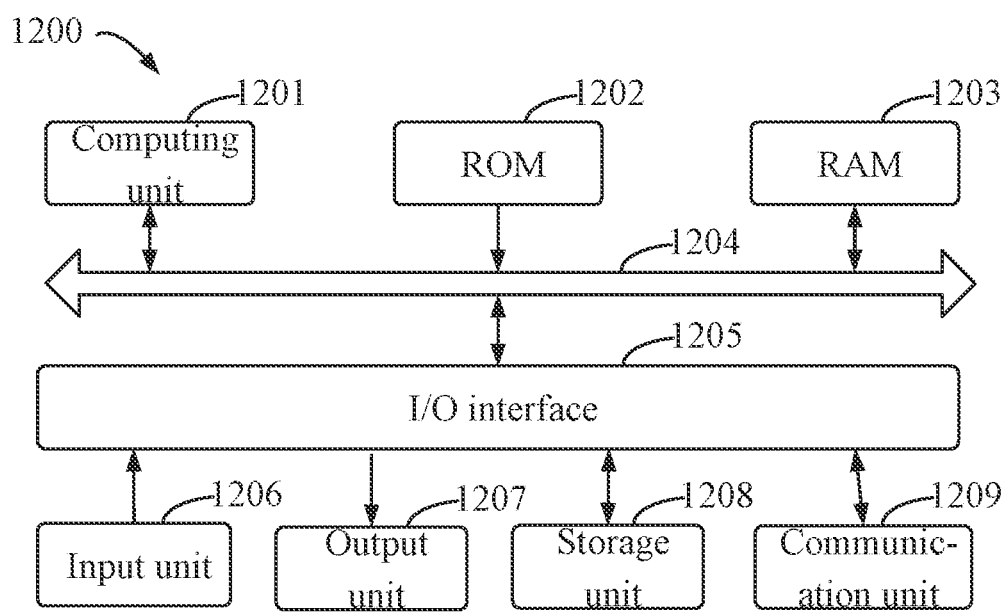
FIG. 12 schematically shows a block diagram of an electronic device for processing traffic data according to embodiments of the present disclosure.

FIG. 12 illustrates a schematic block diagram of an exemplary electronic device 1200 for implementing embodiments of the present disclosure. The electronic device 1200 is intended to represent digital computers of various forms, for example, laptop computers, desktop computers, workstations, personal digital assistants, servers, blade servers, mainframe computers, and other suitable computers. The electronic device may also represent various forms of mobile devices, such as personal digital processing, cellular phones, smart phones, wearable devices, and other similar computing devices. The components, their connections and relationships, and their functions shown herein are merely examples, and are not intended to limit the implementation of the present disclosure described and/or required herein.

As shown in FIG. 12, the device 1200 includes a computing unit 1201, the computing unit may perform various suitable operations and processing according to computer programs stored in a ROM 1202 or computer programs loaded from a storage unit 1208 to a RAM 1203. In the RAM 1203, various programs and data needed for the operation of the device 1200 may also be stored. The computing unit 1201, ROM 1202 and RAM 1203 are connected to each other through a bus 1204. Input/output (I/O) interface 1205 is also connected to the bus 1204.

A plurality of components in the device 1200 are connected to the I/O interface 1205, including: an input unit 1206 such as a keyboard, a mouth, etc.; an output unit 1207 such as a display of various types, a loudspeaker, etc.; a storage unit 1208 such as a disk, an optical disk, etc.; and a communication unit 1209 such as a network card, a modem, a wireless communication transceiver, etc. The communication unit 1209 allows the device 1200 to exchange information/data with other devices through a computer network such as Internet and/or various telecommunication networks.

The computing unit 1201 may be various general-purpose and/or special-purpose processing components with processing and computing capabilities. Some examples of the computing unit 1201 include, but are not limited to, a central processing unit (CPU), a graphics processing unit (GPU), various dedicated artificial intelligence (AI) computing chips, various computing units that run machine learning model algorithms, a digital signal processing (DSP), and any appropriate processor, controller, microcontroller, etc. The computing unit 1201 performs the various methods and processing described above, for example, the method of processing traffic data. For example, in embodiments, the method of processing traffic data may be implemented as a computer software program, which is tangibly contained in a machine-readable medium, such as the storage unit 1208. In embodiments, part or all of the computer program may be loaded and/or installed on the device 1200 via the ROM 1202 and/or the communication unit 1209. When the computer program is loaded onto the RAM 1203 and executed by the computing unit 1201, one or more operations of the method of processing traffic data described above may be performed. In embodiments, the computing unit 1201 may be configured to perform the method of processing traffic data in any other suitable manner (for example, by means of firmware).

Various implementations of the systems and technologies described above in this article may be implemented in a digital electronic circuit system, an integrated circuit system, a field programmable gate array (FPGA), an application specific integrated circuit (ASIC), an application-specific standard product (ASSP), system on chip system (SOC), load programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor may be a dedicated or general-purpose programmable processor that may receive data and instructions from a storage system, at least one input device, and at least one output device, and transmit the data and instructions to the storage system, the at least one input device, and the at least one output device.

The program codes used to implement the method of the present disclosure may be written in any combination of one or more programming languages. These program codes may be provided to processors or controllers of general-purpose computers, special-purpose computers, or other programmable data processing devices, so that when the program codes are executed by the processors or controllers, functions/operations specified in the flowcharts and/or block diagrams are implemented. The program codes may be executed entirely on a machine, partly executed on a machine, partly executed on a machine and partly executed on a remote machine as an independent software package, or entirely executed on a remote machine or a server.

In the context of the present disclosure, a machine-readable medium may be a tangible medium, which may contain or store programs for being used by an instruction execution system, device, or apparatus or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of the machine-readable storage medium would include electrical connections based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the foregoing.

In order to provide interaction with the user, the system and technology described here may be implemented on a computer that has: a display device for displaying information to the user (for example, a CRT (cathode ray tube) or an LCD (liquid crystal display) monitor); and a keyboard and pointing device (for example, a mouse or a trackball) through which the user may provide input to the computer. Other types of devices may also be used to provide interaction with the user; for example, the feedback provided to the user may be sensory feedback of any form (for example, visual feedback, auditory feedback, or tactile feedback); and may receive input from the user in any form (including acoustic input, voice input, or tactile input).

The systems and technologies described here may be implemented in a computing system that includes back-end components (for example, as a data server), or a computing system that includes middleware components (for example, an application server), or a computing system that includes front-end components (for example, a user computer with a graphical user interface or a web browser through which the user may interact with the implementation of the system and technology described herein), or a computing system including any combination of the back-end components, the middleware components, or the front-end components. The components of the system may be connected to each other through digital data communication (for example, communication network) in any form or medium. Examples of the communication networks include: local area network (LAN), wide area network (WAN), and the Internet.

A computer system may include a client and a server. The client and server are generally far away from each other and interact through a communication network. A relationship between the client and the server is generated by running computer programs that have a client-server relationship with each other on corresponding computers.

It should be understood that the various forms of processes shown above may be used to reorder, add or delete operations. For example, the operations described in the present disclosure may be performed in parallel, sequentially, or in a different order, as long as the desired result of the technical solution disclosed in the present disclosure may be achieved, which is not limited herein.

The above specific embodiments do not constitute a limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method of processing traffic data, the method comprising:
   acquiring initial traffic data for a vehicle, wherein the initial traffic data comprises current position information of the vehicle, position information of a plurality of traffic objects and feature information;
   determining a relative positional relationship between the current position information of the vehicle and the position information of the plurality of traffic objects;
   processing, by a vehicle computer system of a vehicle, the initial traffic data, based on the feature information and/or the relative positional relationship, to acquire at least one traffic data set; and
   navigating the vehicle based on the at least one traffic data set,
   wherein the plurality of traffic objects comprises a plurality of roads, the initial traffic data comprises road data of the plurality of roads, and the at least one traffic data set comprises a first traffic data set,
   wherein the processing the initial traffic data comprises:
      determining road data of a current road where the vehicle is located from the road data of the plurality of roads, based on the relative positional relationship;
      determining road data of a neighboring road from the road data of the plurality of roads based on the relative positional relationship and the road data of the current road, wherein a positional relationship between the neighboring road and the current road meets a first preset positional relationship and wherein the road data of the neighboring road comprises a relative target direction of the neighboring road; and
      determining the first traffic data set based on the road data of the neighboring road and/or the current position information of the vehicle, the determining the first traffic data set comprises:
         calculating a first direction from the current position of the vehicle to a first feature point of the neighboring road based on the current position information of the vehicle and position information of the first feature point of the neighboring road;
         calculating a second direction from the first feature point to a second feature point of the neighboring road based on the position information of the first feature point of the neighboring road and position information of the second feature point of the neighboring road;

determining a relative reference direction between the first direction and the second direction based on the first direction and the second direction;

replacing the relative target direction in the road data of the neighboring road with the relative reference direction to acquire an updated road data of the neighboring road, in a case where an angle between the relative target direction and the relative reference direction is greater than a preset angle; and designating the updated road data of the neighboring road as the first traffic data set.

2. The method according to claim 1, wherein the at least one traffic data set comprises a second traffic data set and the feature information comprises a keyword; and wherein the processing the initial traffic data comprises:
determining traffic data with the keyword from the initial traffic data as vehicle data;
determining road data of a current road where the vehicle is located from the initial traffic data, based on the relative positional relationship; and
determining the second traffic data set based on the vehicle data and the road data of the current road.

3. The method according to claim 2, wherein the vehicle data comprises a distance between a position of the vehicle and a destination as a first target distance and comprises the current position information of the vehicle; and wherein the determining the second traffic data set comprises:
acquiring position information of the destination;
calculating a distance between a current position of the vehicle and the destination in real time as a first reference distance based on the current position information of the vehicle and the position information of the destination;
replacing the first target distance in the vehicle data with the first reference distance to acquire updated vehicle data, in a case where a difference between the first target distance and the first reference distance is greater than a first preset threshold; and
designating the updated vehicle data and the road data of the current road as the second traffic data set.

4. The method according to claim 1, wherein the road data of the neighboring road comprises a second target distance and the second target distance is a distance between the current position of the vehicle and a feature point of the neighboring road; and wherein the determining the first traffic data set comprises:
calculating a second reference distance between the current position of the vehicle and the feature point of the neighboring road based on the current position information of the vehicle and position information of the feature point of the neighboring road;
replacing the second target distance in the road data of the neighboring road with the second reference distance to acquire an updated road data of the neighboring road, in a case where a difference between the second target distance and the second reference distance is greater than a second preset threshold; and
designating the updated road data of the neighboring road as the first traffic data set.

5. The method according to claim 1, wherein the at least one traffic data set comprises a second traffic data set and the initial traffic data comprises object data of each of the plurality of traffic objects; and wherein the processing the initial traffic data comprises:
determining object data of a traffic object from the object data of the plurality of traffics objects as road data of a current road where the vehicle is located, based on the relative positional relationship;
determining object data of at least one traffic object from the object data of the plurality of objects based on the relative positional relationship and the road data of the current road, wherein a positional relationship between the at least one traffic object and the current road meets a second preset positional relationship; and
determining the second traffic data set based on the object data of the at least one traffic object.

6. The method according to claim 5, wherein the at least one traffic object comprises at least one road, the object data of the plurality of traffic objects comprises road information, and the road information comprises feature points of the at least one road; and wherein the determining the second traffic data set comprises:
determining a target road from the at least one road;
determining a direction data of the target road based on the feature point of each road of the at least one road; and
designating the direction data of the target road as the second traffic data set.

7. The method according to claim 6, wherein the at least one road comprises a plurality of roads; and wherein the determining the direction data of the target road comprises:
determining a direction of the target road and a direction of a first road based on the feature point of each road of the at least one road;
determining a relative direction between the direction of the target road and the direction of the first road, wherein the first road is a road adjacent to the target road in the plurality of roads;
determining a direction from a first feature point of the first road to a starting feature point of the target road as a starting direction;
determining a direction from a terminated feature point of the target road to a second feature point of a second road as a terminated direction, wherein the second road is a road adjacent to the target road in the plurality of roads; and
designating the relative direction, the starting direction and the terminated direction as the direction data of the target road.

8. The method according to claim 1, wherein the plurality of traffic objects comprises a road and/or a point of interest.

9. An electronic device, comprising:
at least one processor; and
a memory communicatively connected to the at least one processor, wherein the memory stores instructions, that when executed by the at least processor, are configured to cause the at least one processor to at least:
acquire initial traffic data for a vehicle, wherein the initial traffic data comprises current position information of the vehicle, position information of a plurality of traffic objects and feature information;
determine a relative positional relationship between the current position information of the vehicle and the position information of the plurality of traffic objects; and
process the initial traffic data, based on the feature information and/or the relative positional relationship, to acquire at least one traffic data set so as to navigate the vehicle based on the at least one traffic data set, wherein the plurality of traffic objects comprises a plurality of roads, the initial traffic data comprises road data of the plurality of roads and the at least one traffic data set comprises a first traffic data set, and wherein the instructions configured to cause the at least one processor to process the initial traffic data are further configured to cause the at least one processor to:

determine road data of a current road where the vehicle is located from the road data of the plurality of roads, based on the relative positional relationship;

determine road data of a neighboring road from the road data of the plurality of roads based on the relative positional relationship and the road data of the current road, wherein a positional relationship between the neighboring road and the current road meets a first preset positional relationship and wherein the road data of the neighboring road comprises a relative target direction of the neighboring road; and determine the first traffic data set based on the road data of the neighboring road and/or the current position information of the vehicle, wherein the determination of the first traffic data set comprises:

calculation of a first direction from the current position of the vehicle to a first feature point of the neighboring road based on the current position information of the vehicle and position information of the first feature point of the neighboring road;

calculation of a second direction from the first feature point to a second feature point of the neighboring road based on the position information of the first feature point of the neighboring road and position information of the second feature point of the neighboring road;

determination of a relative reference direction between the first direction and the second direction based on the first direction and the second direction;

replacement of the relative target direction in the road data of the neighboring road with the relative reference direction to acquire an updated road data of the neighboring road, in a case where an angle between the relative target direction and the relative reference direction is greater than a preset angle; and designation of the updated road data of the neighboring road as the first traffic data set.

10. The electronic device according to claim 9, wherein the at least one traffic data set comprises a second traffic data set and the feature information comprises a keyword; and wherein the instructions configured to cause the at least one processor to process the initial traffic data are further configured to cause the at least one processor to:

determine traffic data with the keyword from the initial traffic data as vehicle data;

determine road data of a current road where the vehicle is located from the initial traffic data, based on the relative positional relationship; and determine the second traffic data set based on the vehicle data and the road data of the current road.

11. The electronic device according to claim 9, wherein the road data of the neighboring road comprises a second target distance and the second target distance is a distance between the current position of the vehicle and a feature point of the neighboring road; and wherein the instructions configured to cause the at least one processor to determine the first traffic data set are further configured to cause the at least one processor to:

calculate a second reference distance between the current position of the vehicle and the feature point of the neighboring road based on the current position information of the vehicle and position information of the feature point of the neighboring road;

replace the second target distance in the road data of the neighboring road with the second reference distance to acquire an updated road data of the neighboring road, in a case where a difference between the second target distance and the second reference distance is greater than a second preset threshold; and designate the updated road data of the neighboring road as the first traffic data set.

12. The electronic device according to claim 9, wherein the at least one traffic data set comprises a second traffic data set and the initial traffic data comprises object data of each of the plurality of traffic objects; and wherein the instructions configured to cause the at least one processor to process the initial traffic data are further configured to cause the at least one processor to:

determine object data of a traffic object from the object data of the plurality of traffics objects as road data of a current road where the vehicle is located, based on the relative positional relationship;

determine object data of at least one traffic object from the object data of the plurality of objects based on the relative positional relationship and the road data of the current road, wherein a positional relationship between the at least one traffic object and the current road meets a second preset positional relationship; and determine the second traffic data set based on the object data of the at least one traffic object.

13. The electronic device according to claim 9, wherein the plurality of traffic objects comprises a road and/or a point of interest.

14. A non-transitory computer-readable storage medium having instructions therein, the instructions, when executed by a computer system, configured to cause the computer system to at least:

acquire initial traffic data for a vehicle, wherein the initial traffic data comprises current position information of the vehicle, position information of a plurality of traffic objects and feature information;

determine a relative positional relationship between the current position information of the vehicle and the position information of the plurality of traffic objects; and process the initial traffic data, based on the feature information and/or the relative positional relationship, to acquire at least one traffic data set so as to navigate the vehicle based on the at least one traffic data set, wherein the plurality of traffic objects comprises a plurality of roads, the initial traffic data comprises road data of the plurality of roads and the at least one traffic data set comprises a first traffic data set, and wherein the instructions configured to cause the computer system to process the initial traffic data are further configured to cause the computer system to:

determine road data of a current road where the vehicle is located from the road data of the plurality of roads, based on the relative positional relationship;

determine road data of a neighboring road from the road data of the plurality of roads based on the relative positional relationship and the road data of the current road, wherein a positional relationship between the neighboring road and the current road meets a first preset positional relationship and wherein the road data of the neighboring road comprises a relative target direction of the neighboring road; and determine the first traffic data set based on the road data of the neighboring road and/or the current position information of the vehicle, wherein the determination of the first traffic data set comprises:

calculation of a first direction from the current position of the vehicle to a first feature point of the neighboring road based on the current position information of the vehicle and position information of the first feature point of the neighboring road;

calculation of a second direction from the first feature point to a second feature point of the neighboring road based on the position information of the first feature point of the neighboring road and position information of the second feature point of the neighboring road;

determination of a relative reference direction between the first direction and the second direction based on the first direction and the second direction;

replacement of the relative target direction in the road data of the neighboring road with the relative reference direction to acquire an updated road data of the neighboring road, in a case where an angle between the relative target direction and the relative reference direction is greater than a preset angle; and designation of the updated road data of the neighboring road as the first traffic data set.

15. The medium according to claim 14, wherein the at least one traffic data set comprises a second traffic data set and the feature information comprises a keyword; and wherein the instructions configured to cause the computer system to process the initial traffic data are further configured to cause the computer system to:

determine traffic data with the keyword from the initial traffic data as vehicle data;

determine road data of a current road where the vehicle is located from the initial traffic data, based on the relative positional relationship; and determine the second traffic data set based on the vehicle data and the road data of the current road.

16. The medium according to claim 15, wherein the vehicle data comprises a distance between a position of the vehicle and a destination as a first target distance and comprises the current position information of the vehicle; and wherein the instructions configured to cause the computer system to determine the second traffic data set are further configured to cause the computer system to:

acquire position information of the destination;

calculate a distance between a current position of the vehicle and the destination in real time as a first reference distance based on the current position information of the vehicle and the position information of the destination;

replace the first target distance in the vehicle data with the first reference distance to acquire updated vehicle data, in a case where a difference between the first target distance and the first reference distance is greater than a first preset threshold; and designate the updated vehicle data and the road data of the current road as the second traffic data set.

17. The medium according to claim 14, wherein the road data of the neighboring road comprises a second target distance and the second target distance is a distance between the current position of the vehicle and a feature point of the neighboring road; and wherein the instructions configured to cause the computer system to determine the first traffic data set are further configured to cause the computer system to:

calculate a second reference distance between the current position of the vehicle and the feature point of the neighboring road based on the current position information of the vehicle and position information of the feature point of the neighboring road;

replace the second target distance in the road data of the neighboring road with the second reference distance to acquire an updated road data of the neighboring road, in a case where a difference between the second target distance and the second reference distance is greater than a second preset threshold; and designate the updated road data of the neighboring road as the first traffic data set.

18. The medium according to claim 14, wherein the at least one traffic data set comprises a second traffic data set and the initial traffic data comprises object data of each of the plurality of traffic objects; and wherein the instructions configured to cause the computer system to process the initial traffic data are further configured to cause the computer system to:

determine object data of a traffic object from the object data of the plurality of traffics objects as road data of a current road where the vehicle is located, based on the relative positional relationship;

determine object data of at least one traffic object from the object data of the plurality of objects based on the relative positional relationship and the road data of the current road, wherein a positional relationship between the at least one traffic object and the current road meets a second preset positional relationship; and determine the second traffic data set based on the object data of the at least one traffic object.

19. The medium according to claim 18, wherein the at least one traffic object comprises at least one road, the object data of the plurality of traffic objects comprises road information, and the road information comprises feature points of the at least one road; and wherein the instructions configured to cause the computer system to determine the second traffic data set are further configured to cause the computer system to:

determine a target road from the at least one road;

determine a direction data of the target road based on the feature point of each road of the at least one road; and designate the direction data of the target road as the second traffic data set.

20. The medium according to claim 14, wherein the plurality of traffic objects comprises a road and/or a point of interest.

\* \* \* \* \*